United States Patent Office 3,553,560
Patented Jan. 5, 1971

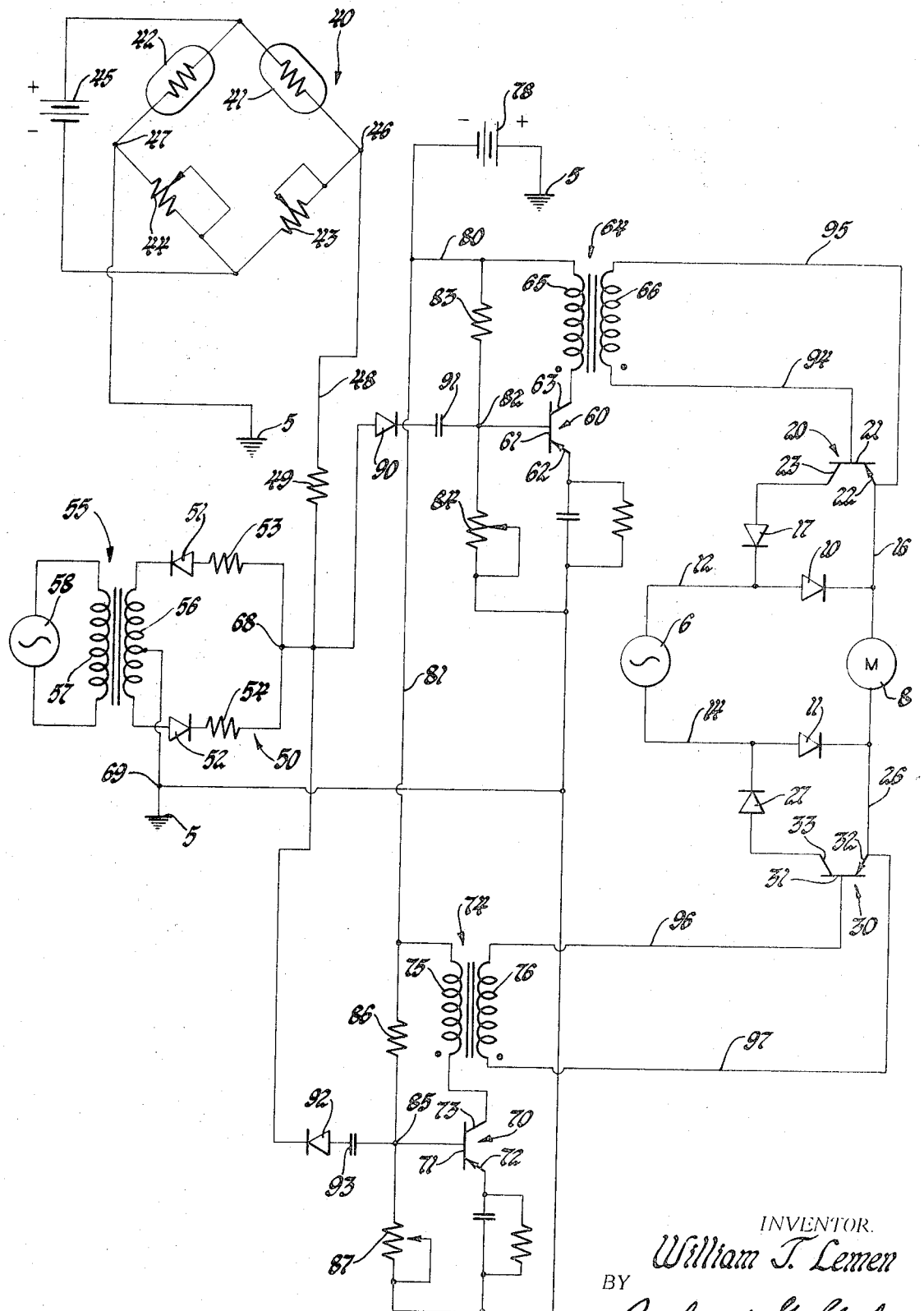

3,553,560
DIRECT CURRENT PERMANENT MAGNET MOTOR SERVOMOTOR SYSTEM
William T. Lemen, Frankfort, Ind., assignor to General Motors Corporation, Detroit, Mich., a corporation of Delaware
Filed Aug. 15, 1969, Ser. No. 850,484
Int. Cl. G05f 1/04
U.S. Cl. 318—681
4 Claims

ABSTRACT OF THE DISCLOSURE

A direct current permanent magnet motor servomotor system wherein the armature of the motor is connected across an alternating current potential source through two series connected and oppositely poled diodes, each of which is shunted by the current carrying electrodes of a transistor. A detector circuit responsive to an external influence produces a direct current potential reference signal which changes polarity in response to the direction of change of the external influence and in magnitude in response to the degree of change. This reference signal is impressed across a modulator circuit which produces alternating current half-wave form output control signals of a polarity the same as and a magnitude proportional to the polarity and magnitude of the reference signals. Circuitry responsive to the control signals produces a separate switching signal for each control signal polarity and applies the respective separate switching signals across the base-emitter electrodes of a respective one of the shunting transistors in a polarity relationship to produce collector-emitter current flow through that transistor to establish respective circuits which energize the permanent magnet motor armature for rotation in first and second directions.

---

This invention is directed to servomotor systems and, more specifically, to direct current permanent magnet motor servomotor systems.

Most prior art servomotor systems use expensive split-field direct current motors or equally expensive alternating current servomotors. As permanent magnet direct current motors are substantially more inexpensive than the commonly used type, a servomotor system using a permanent magnet direct current motor is particularly advantageous.

It is, therefore, an object of this invention to provide an improved servomotor system.

It is another object of this invention to provide an improved servomotor system employing a permanent magnet direct current motor.

In accordance with this invention, a direct current permanent magnet motor servomotor system is provided wherein the armature of the motor is connected across an alternating current potential source through two series connected and oppositely poled diodes shunted by the current carrying electrodes of a respective transistor which may be rendered conductive by respective switching signals produced in response to opposite polarity control signals of a polarity indicative of and a magnitude proportional to the degree of change of an external influence.

For a better understanding of the present invention together with additional objects, advantages and features thereof, reference is made to the following description and accompanying single figure drawing which sets forth the direct current permanent magnet motor servomotor system of this invention in schematic form.

As point of reference or ground potential is the same point electrically throughout the system, it has been schematically represented by the accepted symbol and referenced by the numeral 5.

The direct current permanent magnet motor servomotor system of this invention comprises in combination with an alternating current supply potential source 6 and a direct current permanent magnet motor having a rotatable armature 8, circuitry including at least two unidirectional current translating devices connected in series and poled in an opposite polarity relationship for connecting the motor armature 8 across the alternating current supply potential source 6; first and second normally open electrical switching devices of the type which are operable to at least a second position which closes an electrical circuit through the current carrying elements thereof in response to an electrical signal; circuitry for connecting the current carrying elements of each one of the switching devices in shunt across a respective one of the unidirectional current translating devices; a detector circuit responsive to any change of a selected external influence for producing a direct current potential reference signal which changes polarity with respect to a reference point in response to the direction of the change of the selected external influence and in magnitude in response to the degree of change; a modulator circuit responsive to the reference signal for producing alternating current half-wave form output control signals of a selected one polarity when the reference signal is of a positive polarity and of the opposite polarity when the reference signal is of a negative polarity and of a magnitude proportional to the magnitude of the reference signal; circuitry responsive to the alternating current half-wave form control signals of a selected one polarity for producing a first electrical signal and for applying the first electrical signal to a selected one of the first and second switching devices for operating this switching device to the second position whereby an electrical circuit is completed in shunt around the unidirectional current translating device across which the selected switching device is connected and circuitry responsive to the alternating current half-wave form control signals of the opposite polarity for producing a second electrical signal and for applying the second electrical signal to the other one of the first and second switching devices for operating this switching device to the second position whereby an electrical circuit is completed in shunt around the other one of the unidirectional current translating devices.

As alternating current supply potential source 6 may be any well known alternating current power source compatible with motor armature 8 and, per se, forms no part of this invention, it has been shown in the figure in block form.

The unidirectional current translating devices which are included in the circuit for connecting motor armature 8 across the alternating current supply potential source 6 may be diodes 10 and 11. Diodes 10 and 11 and motor armature 8 are connected in series across the alternating current supply potential source 6 through leads 12 and 14 with the diodes 10 and 11 being poled in an opposite polarity relationship. In the figure, diodes 10 and 11 are shown to be located on opposite sides of motor armature 8. It is to be specifically understood that diodes 10 and 11 may both be located on the same side of the motor armature 8 without departing from the spirit of the invention.

The normally open electrical switching devices may be transistors and are shown in the figure as type PNP transistor 20 having the usual control electrode, base electrode 21, and two current carrying electrodes, emitter electrode 22 and collector electrode 23, and type PNP transistor 30, also having the usual control electrode, base electrode 31, and two current carrying electrodes, emitter electrode 32 and collector electrode 33. Transistors 20 and 30 will hereinafter be referred to as shunting transistors.

As the collector-emitter electrodes of each of these transistors are the current elements thereof, the collector-emitter electrodes of each of transistors 20 and 30 are connected in shunt across a respective one of the unidirectional current translating diodes 10 and 11 and poled to conduct current therethrough in a direction opposite to that in which the unidirectional current translating diode across which it is connected normally conducts. The emitter-collector electrodes of transistor 20 are connected in shunt with diode 10 through lead 16 and diode 17, respectively, and the emitter-collector electrodes of transistor 30 are connected in shunt across diode 11 through lead 26 and diode 27, respectively. As looking at the figure, diodes 10 and 11 are poled to normally conduct current from alternating current supply potential source 6 toward motor armature 8 and, since transistors 20 and 30 are both of the PNP type, the emitter-collector electrodes of both are poled to normally conduct current in the opposite direction from motor armature 8 toward alternating current supply potential source 6.

Without intent or inference of a limitation thereto, a detector circuit, suitable for use with the servomotor circuit of this invention, is set forth in the figure and referenced by the numeral 40. This detector circuit is comprised of two light sensitive resistors 41 and 42 and two variable resistors 43 and 44 connected in a bridge type configuration. Resistors 43 and 44 are of the variable type for the purpose of balancing the bridge for calibration purposes. The potential source for detector circuit 40 may be a battery 45 connected across the junction between light sensitive resistors 41 and 42 and the junction between variable resistors 43 and 44.

Without intention or inference of a limitation thereto, a modulator circuit suitable for use with the servomotor circuit of this invention is set forth in the figure and referenced by the numeral 50. This modulator circuit is comprised of two diodes 51 and 52 and two resistors 53 and 54 connected in series across the center tapped secondary winding 56 of a transformer 55, the primary winding 57 of which may be connected across an alternating current operating potential source 58. The input and output circuitry for modulator circuit 50 may be terminals 68 and 69 or any other electrical device suitable for connection to external circuitry.

The reference signal produced by detector circuit 40 appears across output terminals 46 and 47 and is applied across the input circuit terminals 68 and 69 of modulator circuit 50 through lead 48 and current limiting resistor 49, connected between output terminal 46 of detector 40 and input terminal 68 of modulator 50, and point of reference or ground potential 5, connected to output terminal 47 of detector circuit 40 and input terminal 69 of modulator circuit 50.

The circuitry responsive to the alternating current halfwave form control signals, hereinafter referred to as control signals, of a selected one polarity for producing a first electrical switching signal and for applying the first electrical switching signal to a selected one of the first and second switching devices for operating this switching device to the second position whereby an electrical circuit is completed in shunt around the unidirectional current translating device across which the selected switching device is connected and the circuitry responsive to the control signals of the opposite polarity for producing a second electrical switching signal and for applying the second electrical switching signal to the other one of the first and second switching devices for operating this switching device to the second position whereby an electrical circuit is completed in shunt around the other one of the current translating devices comprises type PNP transistor 60 having the usual control electrode, base electrode 61, and two current carrying electrodes, emitter electrode 62 and collector electrode 63, and type PNP transistor 70, also having the usual control electrode, base electrode 71, and two current carrying electrodes, emitter electrode 72 and collector electrode 73, and coupling transformers 64 and 74, each having respective primary windings 65 and 75 and secondary windings 66 and 76.

To provide an operating potential for this circuitry, a conventional battery 78 having the positive polarity terminal thereof connected to point of reference or ground potential 5 may be employed.

The primary winding of one of coupling transformers 64 or 74 and the current carrying electrodes of one of transistors 60 or 70 and the primary winding of the other coupling transformer and the current carrying electrodes of the other transistor are connected in series across source of direct current operating potential 78.

In the figure, primary winding 65 of coupling transformer 64 and the current carrying electrodes, collector electrode 63 and emitter electrode 62, of transistor 60 are connected in series across the source of direct current operating potential 78 through lead 80 and point of reference or ground potential 5 and primary winding 75 of coupling transformer 74 and the current carrying electrodes, collector electrode 73 and emitter electrode 72, of transistor 70 are connected in series across source of direct current operating potential 78 through lead 81 and point of reference or ground potential 5. As the emitter electrodes of both transistors 60 and 70 are connected to the positive polarity terminal of operating potential source 78 through point of reference or ground potential 5 and the collector electrodes of both are connected to the negative polarity terminal of operating potential source 78 through primary winding 65 and lead 80 and primary winding 75 and lead 81, respectively, these transistors are properly poled for emitter-collector conduction therethrough.

Circuitry is provided for biasing a selected one of transistors 60 or 70 normally conductive through the current carrying electrodes thereof and other circuitry is provided for biasing the other one of transistors 60 and 70 normally not conductive through the current carrying electrodes thereof.

The control electrode, base electrode 61, of transistor 60 is connected to junction 82 between resistor 83 and variable resistor 84 connected in series across source of direct current operating potential 78 through lead 80 and point of reference or ground potential 5. The ohmic value of resistor 83 is selected to provide a potential upon junction 82 which is of a negatvie polarity with respect to the potential upon emitter electrode 62 of transistor 60. As this is the proper polarity relationship for emitter-base current flow through a type PNP transistor, transistor 60 is normally conductive through the emitter-collector electrodes thereof. For best operation, transistor 60 should be biased to substantial saturation. Variable resistor 84 provides a gain control in this circuit.

The control electrode, base electrode 71, of type PNP transistor 70 is connected to junction 85 between resistor 86 and variable resistor 87 connected in series across source of direct current operating potential 78 through lead 81 and point of reference or ground potential 5. The ohmic value of resistor 86 is selected to provide a potential upon junction 85 which is of a negative polarity with respect to the potential upon emitter electrode 72 of transistor 70 but of a magnitude which provides a potential difference across the emitter-base junction of transistor 70 of insufficient magnitude to produce emitter-base current flow therethrough. Consequently, type PNP transistor 70 is normally not conductive through the emitter-collector electrodes thereof. Variable resistor 87 provides a gain control in this circuit.

Circuitry is provided for applying the control signals produced by modulator circuit 50 of a selected one polarity across the control electrode and a selected one of the current carrying electrodes of the one of transistors 60 or 70 which is biased normally conductive in a polarity relationship which will reduce or cut off conduction through the current carrying electrodes thereof, and other circuitry is provided for applying the alternating current half-wave form control signals of the opposite polarity across the control electrode and a selected one of the current carrying electrodes of the other one of transistors 60 and 70 in a polarity relationship which will produce or increase conduction through the current carrying electrodes thereof.

To reduce or cut off emitter-collector conduction through a type PNP transistor, a signal potential may be applied across the base-emitter electrodes thereof which is of a positive polarity upon the base electrode with respect to the potential upon the emitter electrode. As transistor 60 is the normally conductive one of transistors 60 and 70, those control signals produced by modulator circuit 50 which are of a positive polarity at output terminal 68 with respect to output terminal 69, hereinafter referred to as the positive polarity control signals, may be applied across the base-emitter electrodes of transistor 60.

To produce or increase emitter-collector conduction through a type PNP transistor, a potential signal may be applied across the base-emitter electrodes thereof which is of a negative polarity upon the base electrode with respect to the potential upon the emitter electrode. As transistor 70 is the normally not conductive one of transistors 60 and 70, those control signals produced by modulator circuit 50 which are of a negative polarity at output terminal 68 with respect to output terminal 69, hereinafter referred to as the negative polarity control signals, may be applied across the emitter-base electrodes of transistor 70.

Therefore, one of the output circuit terminals 69 of modulator 50 is connected to the emitter electrode of both transistors 60 and 70 through point of reference or ground potential 5 and the other one terminal 68 of modulator circuit 50 is connected to the base electrode 61 of transistor 60 through the series combination of isolating diode 90 and coupling capacitor 91, in that order, with the isolating diode 90 poled to conduct current toward the base electrode 61 of transistor 60 and to the base electrode 71 of transistor 70 through the series combination of isolating diode 92 and coupling capacitor 93, in that order, with isolating diode 92 poled to conduct current toward output terminal 68. Isolating diodes 90 and 92 not only couple each polarity control signal to the proper transistor 60 or 70 but also serve to block each polarity signal from the wrong one of transistors 60 or 70.

With these connections, the positive polarity control signals reverse-bias the base-emitter junction of transistor 60 to reduce or cut off conduction through the emitter-collector electrodes thereof and the negative polarity control signals forward-bias the base-emitter junction of transistor 70 to produce or increase emitter-collector conduction therethrough.

The secondary winding of the one of coupling transformers 64 or 74 having the primary winding thereof connected in series with the current carrying electrodes of the normally conductive one of transistors 60 or 70 is connected across the control electrode and a selected one of the current carrying electrodes of a selected one of the shunting transistors 20 or 30 in a polarity relationship which will produce conduction through the current carrying electrodes thereof when conduction through the current carrying electrodes of the normally conductive one of transistors 60 or 70 reduces in response to those control signals of a selected one polarity, and other circuitry is provided for connecting the secondary winding of the other one of coupling transformer 64 or 74 across the control electrodes and a selected one of the current carrying electrodes of the other one of the shunting transistors 20 or 30 in a polarity relationship which will produce conduction through the current carrying electrodes thereof when conduction through the other one of transistors 60 or 70 increases in response to those control signals of the opposite polarity.

As the primary winding 65 of coupling transformer 64 is connected in series with the current carrying electrodes of normally conductive transistor 60, the secondary winding 66 of coupling transformer 64 is connected across the base-emitter electrodes of shunting transistor 20 through respective leads 94 and 95. Secondary winding 66 is poled with respect to primary winding 65 in such a manner that the terminal end thereof connected to lead 94 is of a negative polarity with respect to the terminal end connected to lead 95 when conduction through the primary winding 65 decreases with decreased conduction through transistor 60. As this is the correct polarity relationship to produce emitter-base current flow through a type PNP transistor, shunting transistor 20 conducts through the emitter-collector electrodes thereof upon a decrease of conduction through the emitter-collector electrodes of transistir 60 while lead 12 is of a negative polarity with respect to lead 14.

As the primary winding 75 of coupling transformer 74 is connected in series with the current carrying electrodes of the normally not conductive transistor 70, the secondary winding 76 of coupling transformer 74 is connected cross the base-emitter electrodes of shuting transistor 30 through respective leads 96 and 97. Secondary winding 76 is poled with respect to primary winding 75 in such a manner that the terminal end thereof connected to lead 96 is of a negative polarity with respect to the terminal end connected to lead 97 when conduction through the primary winding 75 increases with increased conduction through transistor 70. As this is the correct polarity relationship to produce emitter-base current flow through a type PNP transistor, shunting transistor 30 conducts through the emitter-collector electrodes thereof upon an increase of conduction through the emitter-collector electrodes of transistor 70 while lead 14 is of a negative polarity with respect to lead 12.

A practical application which led to the development of the system of this invention required that a moving light source be accurately tracked. Consequently, the inventor employed the detector bridge circuit 40 consisting of two variable resistors 43 and 44 and two light sensitive resistors 41 and 42, which act as the detecting devices of this bridge circuit, to detect a change of light intensity, the external influence to which this detector bridge circuit is responsive, and produce an output reference signal which is indicative of both the direction and degree of change of the external influence. With the system of this invention, the direct current permanent magnet servomotor may be energized to rotate in either of two directions, depending upon the direction of change of the external influence, and at a speed proportional to the degree of change, i.e., depending upon the polarity and magnitude of the reference signal. It is to be specifically understood that this is only one practical example of an application of the servomotor system of this invention and other detector devices which are sensitive to other external influences, such as pressure, temperature, potential or any other physical phenomena, may be employed so long as it produces a reference signal which changes in polarity and magnitude in response to changes of the external influence.

In the absence of any light or with the presence of equal amounts of light upon both light sensitive resistors 41 and 42, the detector bridge 40 may be balanced by adjusting variable resistors 43 or 44 or both. Assuming that the particular resistors selected as light sensitive resistors 41 and 42 are of the type which increase in resistance in the presence of light, should light sensitive resistor 41 receive greater illumination than light sensitive resistor 42, the reference signal appearing across output terminals 46 and 47 would be of a positive polarity upon output terminal 46 with respect to output terminal 47, or point of reference or ground potential 5, and would be of a magnitude proportional to the illumination difference. Should light sensitive resistor 42 become more illuminated than light sensitive resistor 41, the reference signal appearing across output terminals 46 and 47 would be of a negative polarity upon terminal 46 with respect to terminal 47 or point of reference or ground potential 5 and of a magnitude proportional to the illumination difference.

The modulator circuit 50 which includes the center tapped secondary winding 56 of transformer 55, diodes 51 and 52 and resistors 53 and 54 is of a type well known in the art which is used in many servo system arrangements. As the details of this circuit form no part of this invention, its operation will be only briefly described.

As diodes 51 and 52 are poled in the same direction, an output signal will appear only during those half-cycles of potential source 58 while the terminal end of secondary winding 56 connected to the anode electrode of diode 52 is of a positive polarity with respect to the other terminal end as both diodes 51 and 52 are in the blocking state during the other half-cycles. With zero potential applied across terminals 68 and 69, the potential drop across resistors 53 and 54 is equal, consequently, the bridge is in balance and there is no output signal. With a direct current input signal appearing across terminals 68 and 69 of a positive polarity upon terminal 68 with respect to terminal 69, a positive polarity signal will appear across terminals 68 and 69. With a direct current input signal applied across terminals 68 and 69 of a negative polarity upon terminal 68 with respect to terminal 69, a negative polarity signal will appear across terminals 68 and 69. From this description, it is apparent that the polarity and magnitude of the alternating current half-wave form control signals produced by modulator circuit 50 are dependent upon the polarity and magnitude and direction of unbalance of the bridge circuit which, of course, is determined by the polarity and magnitude of the input reference signals produced by detector circuit 40.

Power is supplied to the direct current motor armature 8 through the power circuit which includes diodes 10 and 11, connected in opposed polarity relationship, shunted by respective shunting transistors 20 and 30. With neither shunting transistor 20 nor 30 conducting, no current will flow through armature 8 as both half-cycles of the alternating current supply potential are blocked by diodes 10 and 11. If either diode should become shorted, the armature will revolve at substantially full speed in a direction as determined by the shorted diode. Shunting transistors 20 and 30 function as variable resistor devices, shunting respective diodes 10 and 11. Therefore, with either transistor conducting, motor armature 8 will revolve in a direction as determined by the conducting shunting transistor and at a speed determined by the degree of conduction therethrough.

As the supply potential source 6 alternately places a negative potential upon the collector electrodes of shunting transistors 20 and 30, this potential is employed as the operating potential for these transistors. Diodes 17 and 27 are included in the circuit to block the positive half-cycles of alternating current supply potential from the collector electrodes of shunting transistors 20 and 30.

Assuming the light sensitive resistors of detector circuit 40 are illuminated in such a manner that the reference signal is of a negative polarity upon terminal 46 with respect to terminal 47, the alternating current half-wave form control signals appearing across output terminals 68 and 69 of modulator circuit 50 would be of a negative polarity upon terminal 68 with respect to 69. This control signal is applied across the emitter-base electrodes of transistor 70 in the proper polarity relationship to produce emitter-base and, consequently, emitter-collector current flow through transistor 70. The increasing current flow through the emitter-collector electrodes of transistor 70 and primary winding 75 of coupling transformer 74 induces a potential switching signal in secondary winding 76 which is of a positive polarity upon the terminal end thereof connected to lead 97 with respect to the terminal end thereof connected to lead 96.

As this switching signal is applied across the emitter-base electrodes of type PNP shunting transistor 30 in the proper polarity relationship to produce emitter-base current flow therethrough, shunting transistor 30 will conduct over those half-cycles of the alternating current supply potential during which lead 14 is of a negative polarity with respect to lead 12. Consequently, current will flow from alternating current supply potential source 6, through lead 12, diode 10, a first direction through motor armature 8, the emitter-collector electrodes of shunting transistor 30, diode 27 and lead 14 to alternating current potential source 6.

Assuming the light sensitive resistors of detector circuit 40 are illuminated in such a manner that the reference signal is of a positive polarity upon terminal 46 with respect to terminal 47, the alternating current half-wave form control signals appearing across output terminals 68 and 69 of modulator circuit 50 would be of a positive polarity upon terminal 68 with respect to 69. This control signal is applied across the emitter-base electrodes of transistor 60 in the polarity relationship to reduce or cut off emitter-base and, consequently, emitter-collector current flow through transistor 60. The decreasing current flow through the emitter-collector electrodes of transistor 60 and primary winding 65 of coupling transformer 64 results in a collapsing magnetic field which induces a potential switching signal in secondary winding 66 which is of a positive polarity upon the terminal end thereof connected to lead 95 with respect to the terminal end thereof connected to lead 94.

As this potential signal is applied across the emitter-base electrodes of type PNP shunting transistor 20 in the proper polarity relationship to produce emitter-base current flow therethrough, shunting transistor 20 will conduct over those half-cycles of the alternating current supply potential during which lead 12 is of a negative polarity with respect to lead 14. Consequently, current will flow from alternating current supply potential source 6, through lead 14, diode 11, a second opposite direction through motor armature 8, the emitter-collector electrodes of shunting transistor 20, diode 17 and lead 12 to alternating current potential source 6.

The magnitude of the difference of illumination between light sensitive resistors 41 and 42 of detector circuit 40, determines the magnitude of the reference signal and, consequently, the control signal. Should the magnitude of these signals be small, the armature 8 of the motor will revolve at a slow speed as shunting transistors 20 or 30 would be only partially turned on at low signal levels. With a large magnitude reference and control signal, the resulting switching signal may bias shunting resistors 20 or 30 to substantial saturation to permit armature 8 to rotate at substantially full speed. It is apparent, therefore, that the speed of motor armature 8 is dependent upon the magnitude of the reference signal produced by detector circuit 40 and the direction of rotation of motor armature 8 is determined by the polarity of the reference signal.

Although specific potentials, electrical polarities and circuit elements have been set forth in this specification, it is to be specifically understood that alternate circuit elements possessing similar electrical characteristics and compatible potential sources and electrical polarities may be employed without departing from the spirit of the invention.

What is claimed is:

1. A direct current permanent magnet motor servomotor system comprising in combination with an alternating current supply potential source and a direct current permanent magnet motor having a rotatable armature,
 means including at least two unidirectional current translating devices connected in series and poled in an opposite polarity relationship for connecting said motor armature across said alternating current supply potential source, first and second normally open electrical switching devices of the type which are operable to at least a second condition which closes an electrical circuit through the current carrying elements thereof in response to an electrical signal, means for connecting said current carrying elements of each one of said switching devices in shunt across a respective one of said unidirectional current translating devices, detector means responsive to any change of a selected external influence for producing a direct current potential reference signal which changes polarity with respect to a reference point in response to the direction of the change of the selected external influence and in magnitude in response to the degree of change, modulator means responsive to said reference signal for producing alternating current half-wave form output control signals of a selected one polarity when said reference signal is of a positive polarity and of the opposite polarity when said reference signal is of a negative polarity and of a magnitude proportional to the magnitude of said reference signal, first circuit means responsive to said alternating current half-wave form control signals of a selected one polarity for producing a first electrical switching signal and for applying said first electrical switching signal to a selected one of said first and second switching devices for operating said switching device to said second condition whereby an electrical circuit is completed in shunt around the said unidirectional current translating device across which said selected switching device is connected, and second circuit means responsive to said alternating current half-wave form control signals of the opposite polarity for producing a second electrical switching signal and for applying said second electrical switching signal to the other one of said first and second switching devices for operating said switching device to said second condition whereby an electrical circuit is completed in shunt around the other one of said unidirectional current translating devices.

2. A direct current permanent magnet motor servomotor system comprising in combination with an alternating current supply potential source and a direct current permanent magnet motor having a rotatable armature, means including at least two unidirectional current translating devices connected in series and poled in an opposite polarity relationship for connecting said motor armature across said alternating current supply potential source, first and second transistors each having two current carrying electrodes and a control electrode, means for connecting said current carrying electrodes of each one of said transistors in shunt across a respective one of said unidirectional current translating devices and poled to conduct current therethrough in a direction opposite to that in which the said unidirectional current translating device across which it is connected normally conducts, detector means responsive to any change of a selected external influence for producing a direct current potential reference signal which changes polarity with respect to a reference point in response to the direction of the change of the selected external influence and in magnitude in response to the degree of change, modulator means responsive to said reference signal for producing alternating current half-wave form output control signals of a selected one polarity when said reference signal is of a positive polarity and of the opposite polarity when said reference signal is of a negative polarity and of a magnitude proportional to the magnitude of said reference signal, first circuit means responsive to said alternating current half-wave form control signals of a selected one polarity for producing a first electrical switching signal and for applying said first electrical switching signal across said control electrode and a selected one of said current carrying electrodes of a selected one of said first and second transistors in a polarity relationship which will produce conduction through the said current carrying electrodes thereof, and second circuit means responsive to said alternating current half-wave form control signals of the opposite polarity for producing a second electrical switching signal and for applying said second electrical switching signal across said control electrode and a selected one of said current carrying electrodes of the other one of said first and second transistors in a polarity relationship which will produce conduction through the said current carrying electrodes thereof.

3. A direct current permanent magnet motor servomotor system comprising in combination with an alternating current supply potential source and a direct current permanent magnet motor having a rotatable armature, first and second diodes, means for connecting said diodes and said motor armature in series across said alternating current supply potential source with said diodes being poled in an opposite polarity relationship, first and second transistors each having two current carrying electrodes and a control electrode, means for connecting said current carrying electrodes of each one of said transistors in shunt across a respective one of said diodes and poled to conduct current therethrough in a direction opposite to that in which the said diode across which it is connected normally conducts, detector means responsive to any change of a selected external influence for producing a direct current potential reference signal which changes polarity with respect to a reference point in response to the direction of the change of the selected external influence and in magnitude in response to the degree of change, modulator means responsive to said reference signal for producing alternating current half-wave form output control signals of a selected one polarity when said reference signal is of a positive polarity and of the opposite polarity when said reference signal is of a negative polarity and of a magnitude proportional to the magnitude of said reference signal, a source of direct current operating potential, third and fourth transistors each having to current carrying electrodes and a control electrode, first and second transformers each having a primary winding and a secondary winding, means for connecting said primary winding of each one of said transformers and said current carrying electrodes of a respective one of said third and fourth transistors in series across said source of direct current operating potential, means for biasing a selected one of said third and fourth transistors normally conductive through said current carrying electrodes thereof, means for biasing the other one of said third and fourth transistors normally not conductive through said current carrying electrodes thereof, means for applying the said alternating current half-wave form control signals of a selected one polarity across said control electrode and a selected one of said current carrying electrodes of the one of said third and fourth transistors which is biased normally conductive in a polarity relationship which will reduce conduction through said current carrying electrodes thereof, means for applying the said alternating current half-wave form control signals of the opposite polarity across said control electrode and a selected one of said current carrying electrodes of the other one of said third and fourth transistors in a polarity relationship which will produce conduction through said current carrying electrodes thereof, means for connecting the said secondary winding of the said transformer having the said primary winding thereof connected in series with the said current carrying electrodes of the normally conductive one of said third and fourth transistors across said control electrode and a selected one of said current carrying electrodes of a selected one of said first and second transistors in a polarity relationship which will produce conduction through said current carrying electrodes thereof when conduction through said current carrying electrodes of the normally conductive one of said third and fourth transistors reduces in response to said alternating current half-wave form control signals of a selected one polarity, and means for connecting said secondary winding of the other one of said transformers across said control electrode and a selected one of said current carrying electrodes of the other one of said first and second transistors in a polarity relationship which will produce conduction through said current carrying electrodes thereof when conduction through the said current carrying electrodes of the other one of said third and fourth transistors increases in response to said alternating current half-wave form control signals of the opposite polarity.

4. A direct current permanent magnet motor servomotor system comprising in combination with an alternating current supply potential source and a direct curcent permanent magnet motor having a rotatable armature, first and second diodes, means for connecting said diodes and said motor armature in series across said alternating current supply potential source with said diodes being poled in an opposite polarity relationship, first and second transistors each having a collector, an emitter and a base electrode, means for connecting said collector-emitter electrodes of each one of said transistors in shunt across a respective one of said diodes and poled to conduct current therethrough in a direction opposite to that in which the said diode across which it is connected normally conducts, a detector circuit responsive to any change of a selected external influence for producing a direct current potential reference signal which changes polarity with respect to a reference point in response to the direction of the change of the selected external influence and in magnitude in response to the degree of change, a modulator circuit having input circuit means and two output circuit terminals for producing alternating current halfewav form output control signals of a selected one polarity when said reference signal is of a positive polarity and of the opposite polarity when said reference signal is of a negative polarity and of a magnitude proportional to the magnitude of said reference signal, means for applying said reference signal across said modulator circuit input circuit means, a source of direct current operating potential, third and fourth transistors each having a collector, an emitter and a base electrode, first and second transformers each having a primary winding and a secondary winding, means for connecting said primary winding of said first transformer and said collector-emitter electrodes of said third transistor in series across said source of direct current operating potential, means for connecting said primary winding of said second transformer and said collector-emitter electrodes of said fourth transistor in series across said source of direct current operating potential, means for biasing said third transistor normally conductive through said collector-emitter electrodes thereof, means for biasing said fourth transistor normally not conductive through said collector-emitter electrodes thereof, first and second isolating diodes, first and second coupling capacitors, means for connecting one of said modulator circuit output circuit terminals to the said emitter electrode of both said third and fourth transistors, means for connecting the other one of said modulator circuit output circuit terminals to the said base electrode of said third transistor through the series combination of one of said isolating diodes and one of said coupling capacitors in that order with said diode poled to conduct toward said base electrode and to the said base electrode of said fourth transistor through the series combination of said second isolating diode and said second coupling capacitor in that order with said diode poled to conduct toward said output terminal whereby said alternating current half-wave form signals of a positive polarity reverse bias the base-emitter junction of said third transistor to reduce conduction through the collector-emitter electrodes thereof and said alternating current half-wave form signals of a negative polarity forward bias the base-emitter junction of said fourth transistor to produce conduction through the collector-emitter electrodes thereof, means for connecting said secondary winding of said first transformer across said base electrode and said emitter electrode of a selected one of said first and second transistors in a polarity relationship which will produce conduction through said collector-emitter electrodes thereof when conduction through said collector-emitter electrodes of said third transistor reduces in response to said alternating current half-wave form control signals of a positive polarity, and means for connecting said secondary winding of said second transformer across said base electrode and said emitter electrode of the other one of said first and second transistors in a polarity relationship which will produce conduction through said collector-emitter electrodes thereof when conduction through said collector-emitter electrodes of said fourth transistor is produced in response to said alternating current-half wave from control signals of a negative polarity.

References Cited

UNITED STATES PATENTS

| | | | |
|---|---|---|---|
| 3,378,739 | 4/1968 | Livingood et al. | 318—28X |
| 3,406,309 | 10/1968 | Martens | 318—18X |
| 3,426,262 | 2/1969 | Colter | 318—313 |
| 3,431,475 | 3/1969 | Wesner | 318—448X |
| 3,453,517 | 7/1969 | Kennedy et al. | 318—257 |

BENJAMIN DOBECK, Primary Examiner

U.S. Cl. X.R.

318—257, 313

PO-1050
(5/69)

UNITED STATES PATENT OFFICE
CERTIFICATE OF CORRECTION

Patent No. 3,553,560            Dated January 5, 1971

Inventor(s) William T. Lemen

It is certified that error appears in the above-identified patent and that said Letters Patent are hereby corrected as shown below:

Column 6, line 19, change "transistir" to -- transistor --

Column 7, line 49, change "resistor" to -- resistance --.

Column 10, line 51, change "to" to -- two --. Column 11, line 34, change "cent" to -- rent --. Column 12, line 55, change "from" to -- form --.

Signed and sealed this 27th day of April 1971.

(SEAL)
Attest:

EDWARD M. FLETCHER, JR.                WILLIAM E. SCHUYLER, JI
Attesting Officer                       Commissioner of Patent: